United States Patent [19]
Itsumi et al.

[11] Patent Number: 5,101,278
[45] Date of Patent: Mar. 31, 1992

[54] AUTOMATIC FOCUS CONTROL APPARATUS FOR A VIDEO CAMERA

[75] Inventors: Kazuhiro Itsumi, Kawasaki; Mamoru Izumi, Tokyo, both of Japan

[73] Assignee: Kabushiki Kaisha Toshiba, Kawasaki, Japan

[21] Appl. No.: 576,935

[22] Filed: Sep. 4, 1990

[30] Foreign Application Priority Data

Oct. 30, 1989 [JP] Japan .................. 1-282307

[51] Int. Cl.⁵ .......................................... H04N 5/232
[52] U.S. Cl. ................................. 358/227; 358/225; 354/402; 310/332
[58] Field of Search ............... 358/227, 225, 224, 226, 358/229, 199; 354/402, 404; 310/332, 331, 369

[56] References Cited

U.S. PATENT DOCUMENTS

| | | | |
|---|---|---|---|
| 3,748,503 | 7/1973 | Cobarg | 310/331 |
| 3,760,203 | 9/1973 | Guntersdorfer | 310/331 |
| 4,160,184 | 7/1979 | Ljung | 310/369 |
| 4,558,367 | 12/1985 | Urata | 358/227 |
| 4,601,539 | 7/1986 | Watanabe | 310/369 |
| 4,748,509 | 5/1988 | Otake | 358/227 |
| 4,975,726 | 12/1990 | Kuga | 354/402 |

FOREIGN PATENT DOCUMENTS

| | | |
|---|---|---|
| 0319127 | 6/1989 | European Pat. Off. . |
| 0241375 | 12/1986 | Fed. Rep. of Germany . |
| 61-54778 | 3/1986 | Japan . |
| 0254081 | 11/1986 | Japan . |
| 0256678 | 11/1986 | Japan . |

OTHER PUBLICATIONS

Junichi Ishida and Yasuhi Fujimaru TV-Camera Automatic Focusing Control by Hill-Climbing Servo System, Research by NHK Giken vol. 17, No. 1, 1965 pp. 21 to 37.

*Primary Examiner*—James J. Groody
*Assistant Examiner*—Sherrie Hsia
*Attorney, Agent, or Firm*—Oblon, Spivak, McClelland, Maier & Neustadt

[57] ABSTRACT

In an automatic focus control apparatus for a video camera including an image pick-up element for picking up an optical image obtained through a lens system composed of a focus lens group, a zoom lens group, a focal position correction lens group and a relay lens group and a defocus detector for detecting a defocus signal corresponding to a defocus of the lens system from an image signal output from the image pickup element, a piezoelectric actuator is provided to move the image pick-up element in an optical-axis direction in accordance with the defocus signal and a motion transmission mechanism connects the image pick-up element to the relay lens group of the lens system to allow that lens group to be moved in a direction opposite to that in which the image pick-up element is moved. A stroke burden which is borne by the piezoelectric actuator can be alleviated by moving the relay lens group together with the image pick-up element.

8 Claims, 7 Drawing Sheets

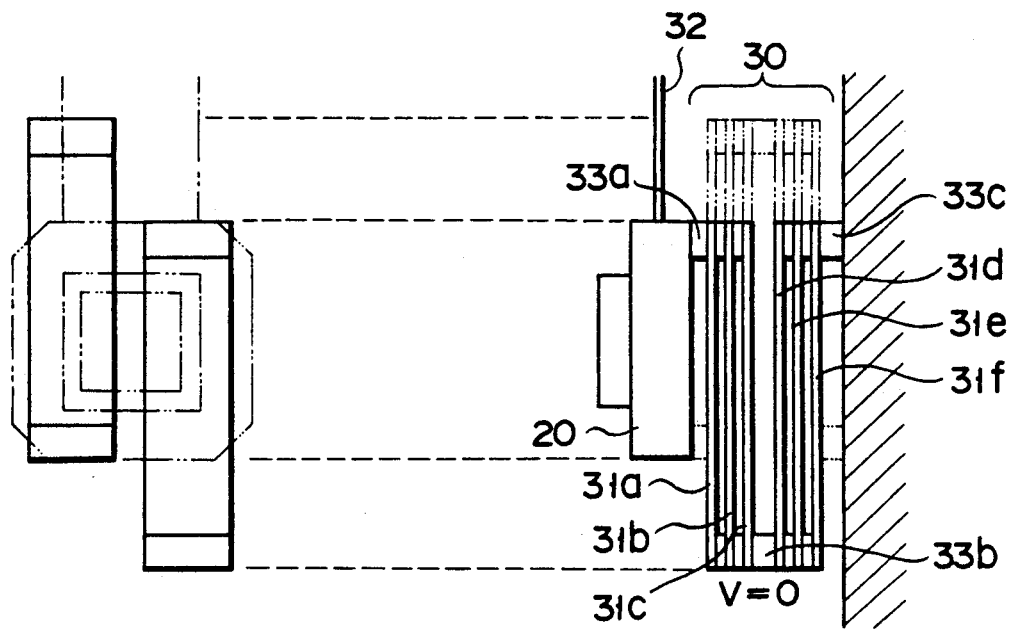
F I G. 2A
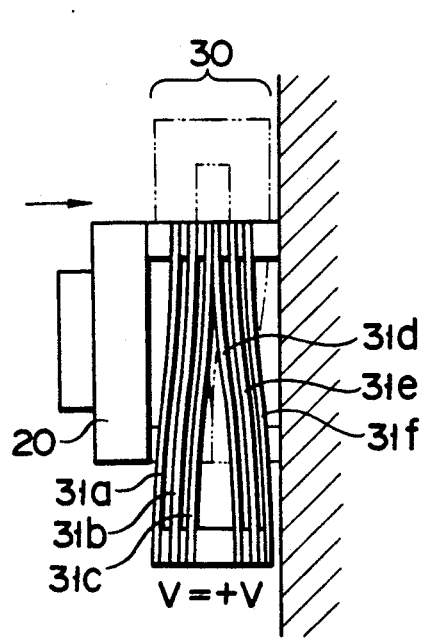
F I G. 2B
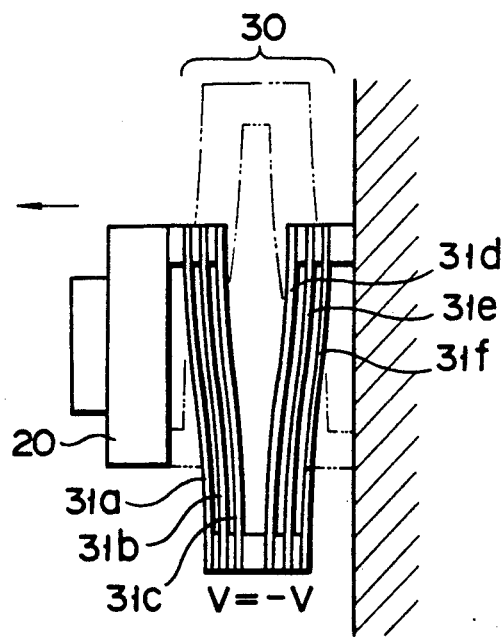
F I G. 2C

AUTOMATIC FOCUS CONTROL APPARATUS FOR A VIDEO CAMERA

BACKGROUND OF THE INVENTION

1. Field of the Invention

The present invention relates to an apparatus for use in a video camera including a lens system composed of a plurality of lens groups and, in particular, to an automatic focus control apparatus for a video camera which can correct a defocus as produced in a lens system.

2. Description of the Related Art

A conventional automatic focus control apparatus for use in a video camera achieves a just-in-focus state as will be set out below. That is, a defocus detection circuit detects a defocus signal corresponding to a defocus from an image signal obtained at an image pick-up element via a lens system. The defocus signal is fed back to a motor to move part of the lens system. Here, the lens system is of such a type that, for example, a focus lens group, a zoom lens group, a focal position correction lens and a relay lens group (or a coupling type lens group) are arranged in that order as viewed from a subject to be imaged. Normally, the focus lens group is moved by a motor in the aforementioned arrangement to gain a "just-in-focus" state. Of these four lens groups, the focus lens group is the largest. Further, an amount of correction by which a defocus resulting from the movement of the focus lens is corrected is small. It is, therefore, necessary to move the larger lens group to a greater extent so that a just-in-focus state may be attained. Moving the focus lens group to achieve the in-focus state in this way requires a complex structure for associated parts or mechanisms of the optical system. In addition, the focus lens group also involves a greater amount of movement, making it difficult to provide a compact, light-weight video camera.

Recently, an automatic focus control apparatus for a video camera has been proposed to obtain a just-in-focus state by moving an image pick-up element in place of the lens group. Stated in more detail, the image pick-up element is of such a type that it is movable by a piezoelectric actuator, that is, it is moved by feeding a defocus signal back to the piezoelectric actuator-Published Unexamined Japanese Patent Application 61-54788. Since, in the aforementioned apparatus, the image pick-up element is moved by the piezoelectric actuator, it is not necessary to provide, for example, a motor and a mechanism for converting a rotational motion of the motor to a linear motion of a focus lens group. This feature simplifies the associated mechanism of the lens system and ensures a compact, light-weight, and easily-operable video camera.

In actual practice, a stroke at which the image pick-up element is moved to obtain an in-focus state is normally as great as an order of a few mm. In the piezoelectric actuator, such as a bimorph element, it is very difficult to achieve a stroke of the order of a few mm. Thus the apparatus as set out immediately above involves a greater burden which is borne by the piezoelectric actuator.

In the apparatus for moving the focus lens group by the motor to gain an in-focus state, the associated parts or mechanisms become complicated in structure and the focus lens group is moved at a greater stroke, failing to implement a compact, light-weight video camera. In the apparatus for moving the image pick-up element by the piezoelectric actuator, such as a bimorph element, to give an in-focus state, a greater stroke burden is borne by the piezoelectric actuator.

SUMMARY OF THE INVENTION

It is accordingly the object of the present invention to provide an automatic focus control apparatus for a video camera which can achieve a just-in-focus state by moving an image pick-up element by a piezoelectric actuator and can alleviate a stroke burden borne by the piezoelectric actuator.

In order to achieve the aforementioned object, the present invention provides an automatic focus control apparatus for a video camera including a lens system composed of a plurality of lenses, which comprises an image pick-up element for picking up an optical image through a lens system and for outputting an image signal corresponding to the optical image;

a defocus detector for detecting a defocus of the lens system from the image signal obtained at the image pick-up element and for outputting a defocus signal corresponding to that defocus;

a drive mechanism for moving the image pick-up element in a direction of an optical axis of the lens system in accordance with the defocus signal obtained at the defocus detector; and a motion transmission mechanism for connecting the image pick-up element to at least one of the lens groups in the lens system and for moving the lens group in a direction opposite to that in which the image pick-up element is moved.

The present invention also provides an automatic focus control apparatus for a video camera including a lens system composed of a plurality of lenses, which comprises:

an image pick-up element for picking up an optical image obtained through the lens system and for outputting an image signal corresponding to the optical image;

a defocus detector for detecting a defocus of the lens system from the image signal obtained at the image pick-up element and for outputting a defocus signal corresponding to that defocus;

a first drive mechanism for moving the image pick-up element in a direction of an optical axis of the lens system in accordance with the defocus signal obtained at the defocus detector; and a second drive mechanism for moving at least one of the lens groups of the lens system, in accordance with the defocus signal from the defocus detector, in a direction opposite to that in which the image pick-up element is moved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A to 2C are views showing an arrangement of a piezoelectric actuator for driving an image pick-up element;

DETAILED DESCRIPTION OF THE PREFERRED EMBODIMENTS

Figure 1:
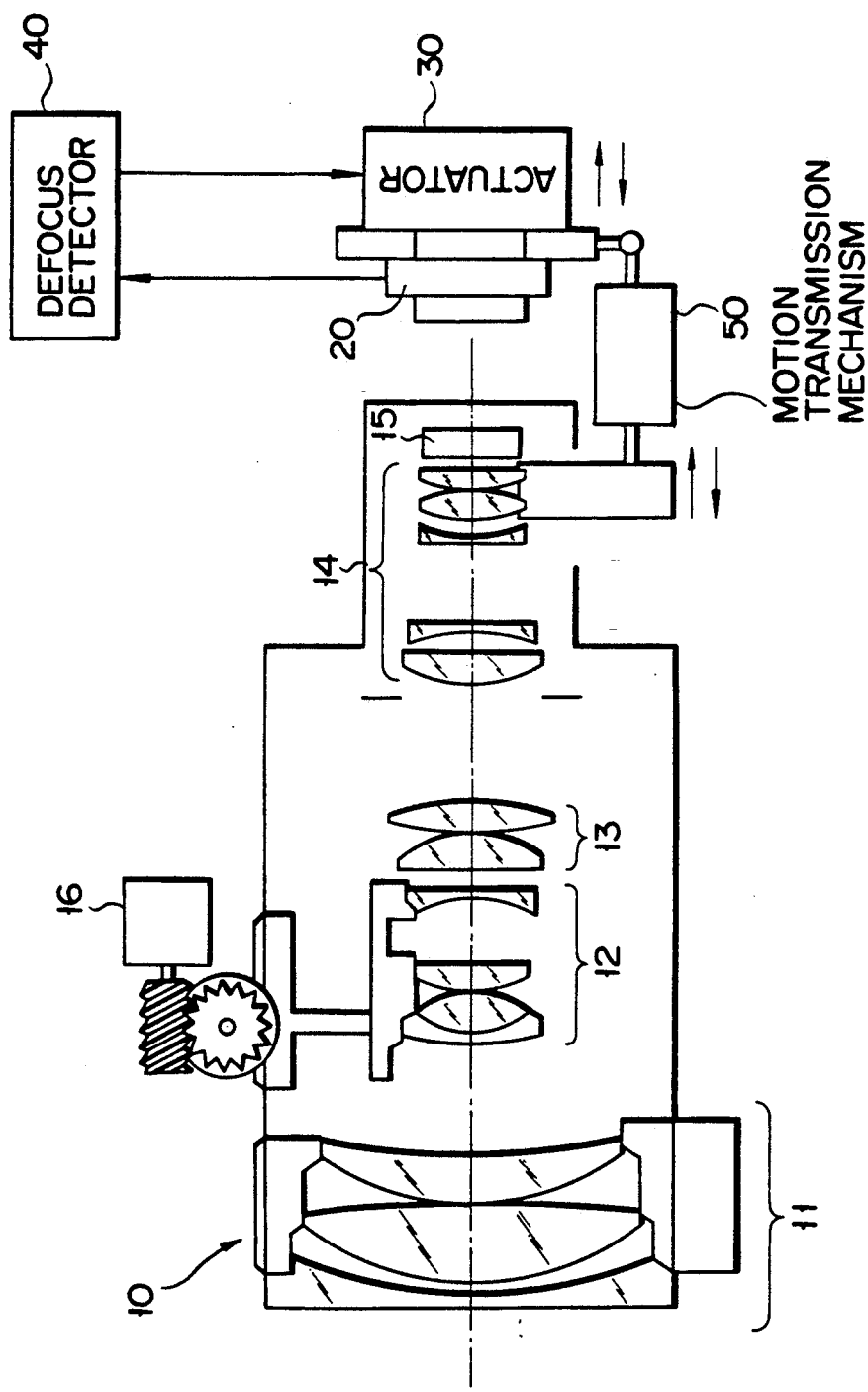
FIG. 1 is a diagrammatic view showing an automatic focus control apparatus according to a first embodiment of the present invention.

The embodiment of the present invention will be explained below with reference to the accompanying drawings.

FIG. 1A is a diagrammatic view showing a video-camera's automatic focusing control apparatus according to a first embodiment of the present invention.

A lens system 10 for the video-camera is so configured that it includes a focusing lens group 11 for focusing, a zoom lens group 12 for varying the size of an image upon being moved relative to the focusing lens group 11, a focal position correction lens group 13, called a compensator, which is so moved as to maintain the position of the image constant, and a relay lens group (or a combination type lens group) 14. Here the respective lens groups 11 to 14 are each composed of a plurality of lenses and the lens 10 is composed of four lens groups.

A low-pass filter 15 is located on a side opposite to that on which a subject is situated. An image pick-up device 20, such as a CCD, is arranged on that opposite side at a location more remote from the low-pass filter 15. The optical image of the subject is imaged by the optical lens system 10 on the image surface of the image pick-up element 20. The image pickup device 20 picks up the optical image and generates a corresponding image signal.

The other side of the image pick-up device 20 is attached to a piezoelectric actuator 30 to enable the image pick-up device 20 to be moved in a direction of the optical axis of the lens system. The piezoelectric actuator 30 is connected at its base end to a fixing member and at its free end (the other end) to the image pick-up device 20. The image signal of the image pickup device 20 is supplied to a signal processing circuit, not shown, for image recording and to a defocus detection circuit 40. The defocus detection circuit 40 is composed of a circuit using a hill-climbing servo system normally built in a video camera, such as "Junichi Ishida and Yasuhi Fujimaru" TV-Camera Automatic Focusing Control by Hill-Climbing Servo System" Research by NHK GIKEN vol. 17, NO, 1, 1965 pp 21 to 37. The defocus detection circuit 40 detects a defocus signal corresponding to an extent of defocus in accordance with the image signal. The defocus signal is converted to a drive signal (voltage) and supplied to the piezoelectric actuator 30.

The free end of the piezoelectric actuator 30, that is, the mount side of the image pick-up device 20, is mechanically coupled by a motion transmission mechanism 50 to a portion of the relay lens group 14. The motion transmission mechanism 50 connects the image pick-up device 20 to the portion of the relay lens group 14 and can transmit a motion by reversing the direction in which the piezoelectric actuator 30 is moved. When the pick-up device 20 is moved in one optical-axis direction by the drive of the piezoelectric actuator 30, the portion of the relay lens group 14 is moved, in synchronism with the movement of the image pick-up device 20, in a direction opposite to that in which the image pick-up device 20 is moved. In FIG. 1, reference numeral 16 represents a motor for moving the zoom lens group.

A practical form of the piezoelectric actuator 30 and that of the motion transmission mechanism 50 will be explained below in more detail.

Figure 3A:
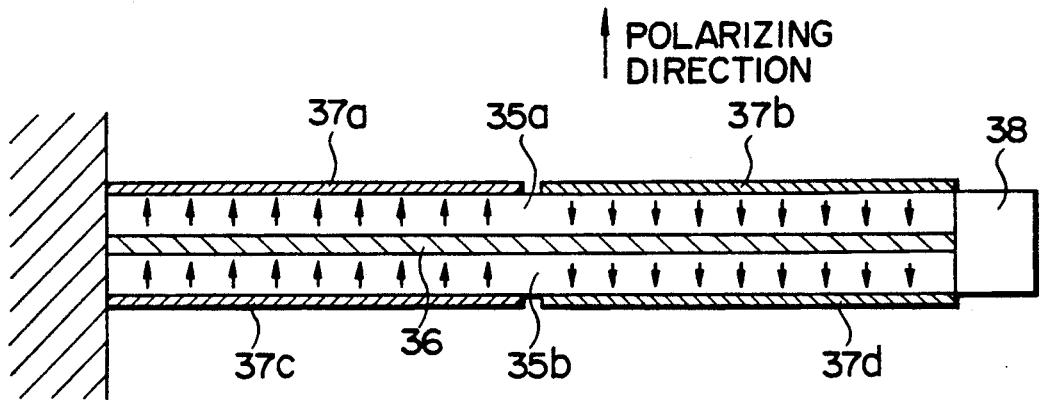
FIGS. 3A and 3B are views showing a figure-of-S drive type bimorph which is a basic element of a piezoelectric actuator.
Figure 3B:
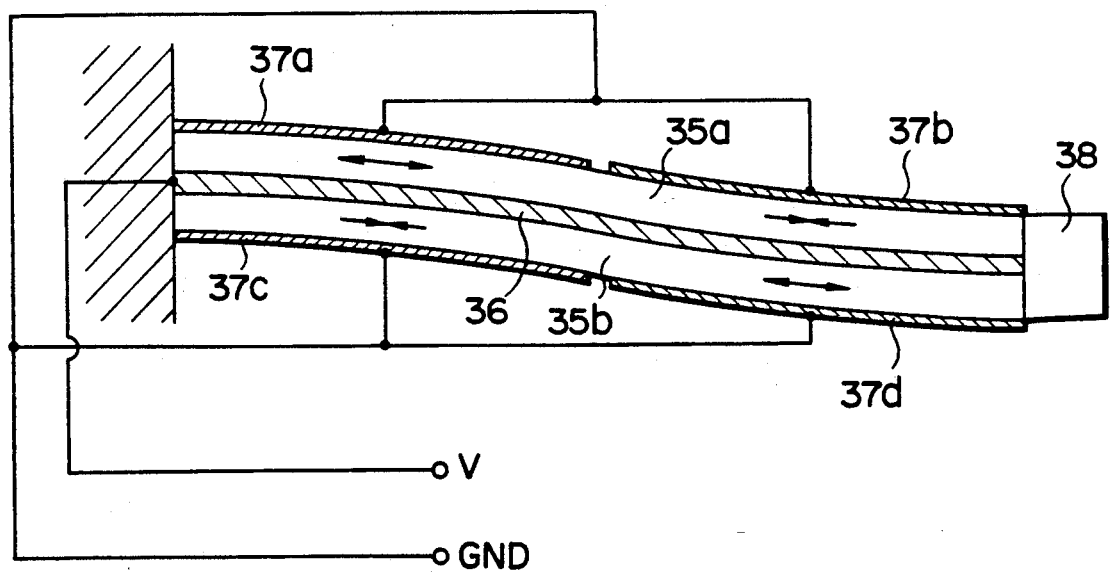

FIG. 2A is a view showing a detail of the piezoelectric actuator 30. The piezoelectric actuator 30 is composed of bimorph elements 31a to 31f for drive in a figure-of-S fashion. The bimorph elements are obtained by forming divided electrodes on both the major surfaces of piezoelectric bodies and performing a polarizing processing as shown, for example in FIG. 3A where 35a, 35b represent the piezoelectric bodies, 36, an electrode serving as both a shin and a sandwiched electrode, 37a to 37b, divided electrodes, and 38, a displacement pick-up end (a free end). If a voltage is applied to the bimorph elements as shown in FIG. 3B, a parallel motion is normally produced at the free end mentioned, because the rotation component of the displacement is cancelled at that free end. For this reason, the bimorph elements having the same displacement direction component are connected at their ends whereby it is possible to improve various mechanical characteristics such as a drive force, as well as the resonant frequency, without decreasing a displacement.

In the examples as shown in FIG. 2A, two bimorph units each composed of three sheets of bimorph elements (31a, 31b, 31c or 31d, 31e, 31f) connected at their ends are used in a cantilever fashion with the corresponding free ends of the respective bimorph units connected together. By so doing, it is possible to ensure a greater displacement and enhanced mechanical characteristics. In a partial application, the bimorph 31a, 31b, 31c, as well as the bimorph element 31d, 31e, and 31f, are connected at respective ends in a superimposed fashion. The bimorph elements 31a, 31b, 31c and 31d, 31e, 31f are connected together at their one end and the other end of the bimorph elements 31d, 31e, 31f, is connected to a fixing member. The bimorph elements 31a, 31b, 31c are connected at their other end to a solid-state image pick-up elements 20.

In the aforementioned embodiment, in order to improve the mechanical characteristics, two bimorph units of an identical structure are provided in a staggered fashion, each unit being composed of the bimorph elements 31a to 31f connected in the manner as set forth above. In FIG. 2A, reference numeral 32 shows a flexible printed board on which an image pick-up element 20 is mounted and 33a, 33b, 33c shows bimorph fixing members.

The piezoelectric actuator 30 thus arranged is 20 mounted on the rear surface of the image pick-up element and can achieve an in-focus motion upon being driven as shown in FIGS. 2B and 2C. FIG. 2B shows a state in which the image-pickup element 20 is moved by the piezoelectric actuator 30 toward the side opposite to that on which the subject is situated, that is, a state in which the focal distance is minimal (1 m for example). FIG. 2C shows a state in which the image pick-up element 20 is moved by the piezoelectric actuator to a maximum extent toward the subject side, that is, a state in which the focal distance is maximal.

Figure 4A:
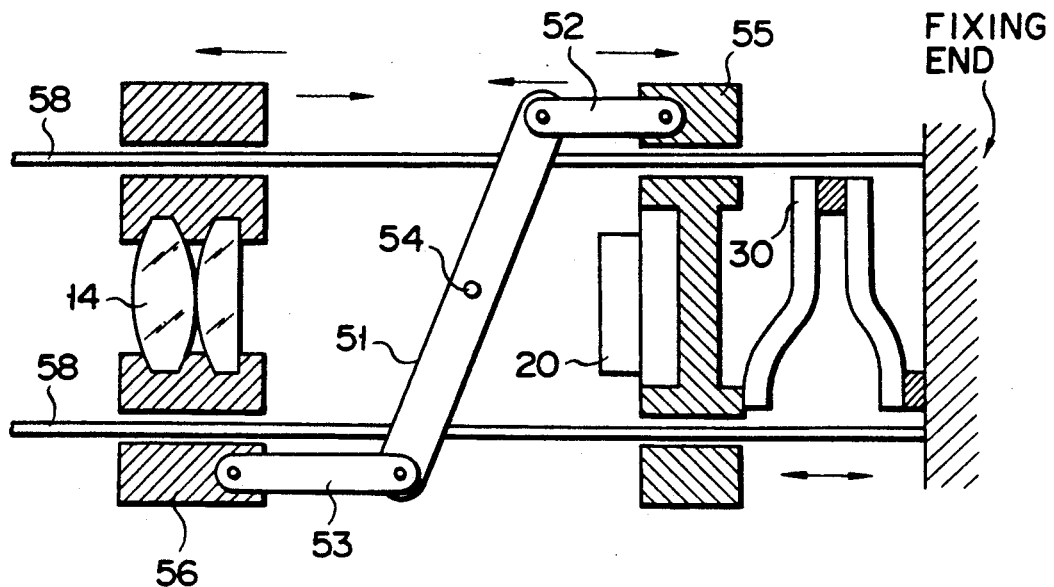
FIGS. 4A and 4B are views showing a practical form of a motion transmission mechanism.
Figure 4B:
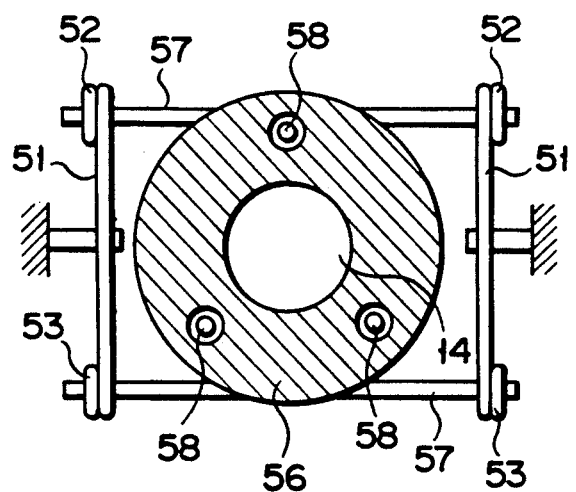

FIGS. 4A and 4B are a side cross-sectional view and front view, respectively, showing a practical form of a motion transmission mechanism 50. The motion transmission mechanism 50 is composed of a link mechanism made up of a pivotal arm 51 and connection arms 52, 53. The pivotal arm 51 is pivotally provided with a pivot 54 as a center and the connection arms 52, 53 are pivotally mounted one at each end of the pivotal arm 51. The connection arm 52 connects the pivotal arm 51 to a holding means 55 for fixedly holding the image pick-up element 20. The connection arm 53 connects the pivotal arm 51 to a holding means for fixedly holding the relay lens group 14. Two link mechanisms are provided as the aforementioned link mechanism such that the holding means 55 and 56 sandwich the two link mechanisms therebetween. The two link mechanisms are connected by connection rods 57 to each other. The holding means 55, 56 are so supported that they are movable by three guides 58 in an optical-axis direction.

In the motion transmission mechanism 50, when the image pick-up element 20 is moved by the piezoelectric actuator 30 to the left of a paper plane, the relay lens group 14 is moved to the right of the paper plane under an action of the respective arms 51-53 of the link mechanism. When, on the other hand, the image pick-up element 20 is moved to the right of the paper plane, the relay lens group 14 is moved to the left of the paper plane. That is, the relay lens group 14 is moved, under the action of the motion transmission mechanism 50, in the direction opposite to that in which the image pick-up element 20 is moved. For a front-focus correction, the image pick-up element 20 is moved toward the subject while the relay lens group 14 is moved away from the subject. For a rear-focus correction, the image pick-up element 20 and relay lens group 14 are moved in the directions opposite to those as set forth above in conjunction with the front-focus correction.

According to the present embodiment, the image pick-up element 20 is connected to the relay lens group 14 by the motion transmission mechanism 50 composed of the link mechanism. It is thus possible to obtain a "just-in-focus" state by moving the image pick-up element 20 and part of the relay lens group 14 by the driving of the piezoelectric actuator 30. For this reason, the just-in-focus state can be achieved without the need of requiring the motor, mechanism for converting the rotation of the motor to a linear motion, and so on. By gaining the just-in-focus condition by moving the image pick-up element 20 and relay lens group 14, it is possible to lessen an amount of movement of the image pick-up element 20 required for focus and to lessen a stroke burden borne by the piezoelectric actuator 30. Depending upon the lens system structure, the stroke as will be understood form the above will be normally one half that when the image pick-up element 20 only is moved. Thus the lens system can be made simpler than a conventional counterpart, thus allowing a video camera to be produced as a low-cost, light-weight unit. Further, because of the use of the piezoelectric actuator 30, the image pick-up element 20 and lens group 14 are moved at a higher speed than that at which a motor is moved, thus achieving a highspeed in-focus state.

Since, in the present embodiment, the piezoelectric actuator 30 is mounted directly on the rear surface of the image pick-up element 20, an advantage is obtained as will be set forth below. That is, when the piezoelectric actuator 30 is mounted directly on the relay lens group 14, the piezoelectric actuator 30 has to be provided outside the relay lens group 14 without the optical path being blocked by the piezoelectric actuator 30. In this case, the piezoelectric actuator 30 imparts a force, in one direction, to the relay lens group 14, making it difficult to move the relay lens group 14 in a parallel motion. In order to prevent this, a plurality of piezoelectric actuators 30 may be provided outside the relay lens group 14, but this results in a bulkier driving mechanism. The use of a ring-like piezoelectric actuator allows a uniform force to be applied to the relay lens group 14 without blocking the optical path. However, the ring-like piezoelectric actuator is very small in its stroke and its drive force. Since, according to the present invention, the piezoelectric actuator 30 can be mounted on the rear surface of the image pick-up element 20, an adequate stroke and drive force can be obtained without blocking the optical path.

Figure 5:
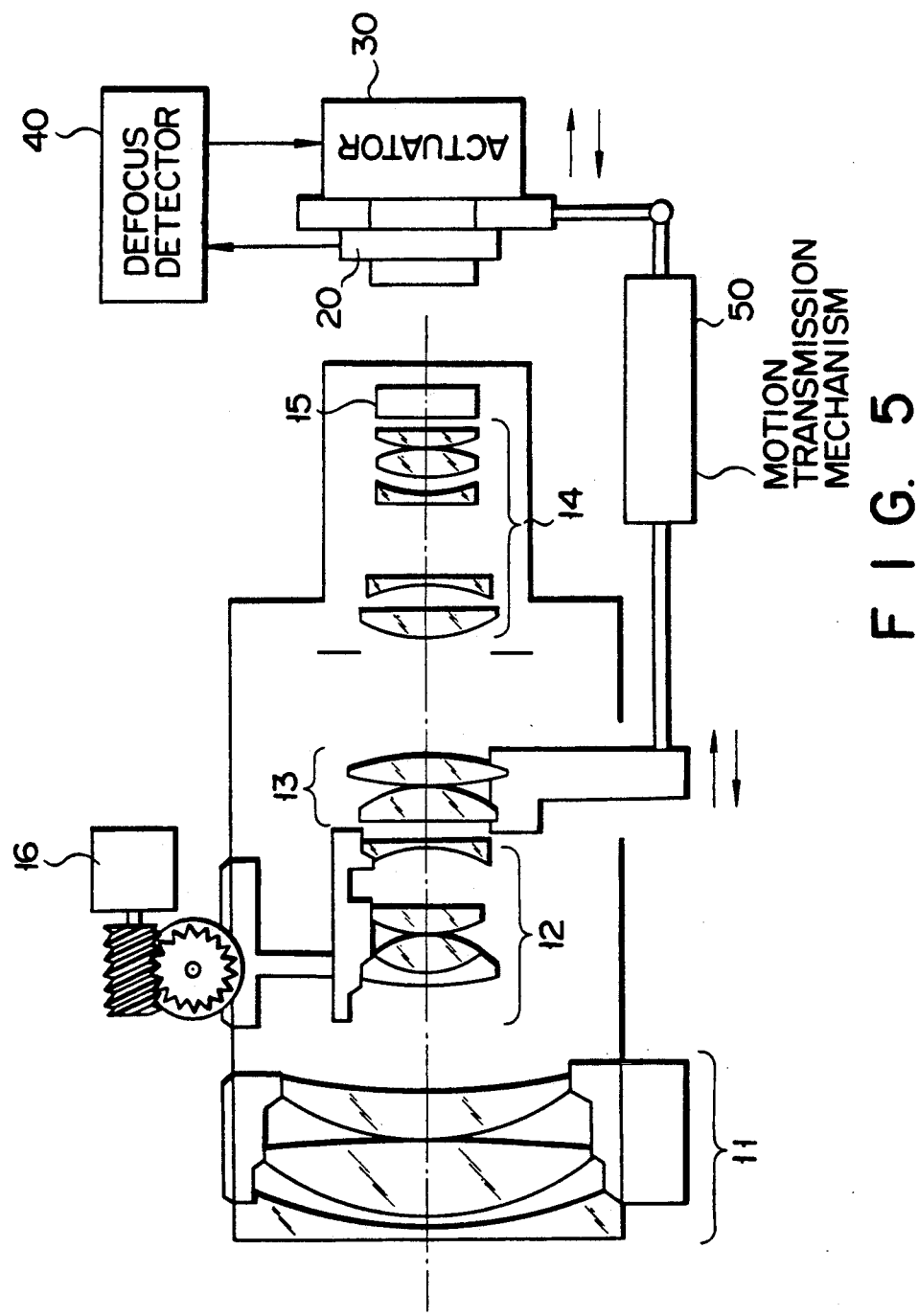
FIG. 5 is a diagrammatic view showing an apparatus according to a second embodiment of the present invention.

FIG. 5 is a diagrammatical view showing a second embodiment of the present invention. In FIG. 5, identical reference numerals are employed to designate parts or elements corresponding to those shown in FIG. 1 and any further explanation is, therefore, omitted.

This embodiment is different from the first embodiment in that the lens group as moved in synchronism with the image pick-up element 20 is employed as a focal position correction lens group 13 in place of the relay lens group 14. That is, with the relay lens group 14 fixed, the focal position correction lens group 13 is, mechanically connected to an image pick-up element 20 through a motion transmission means 50. The other arrangement is the same as a corresponding arrangement shown in FIG. 1. A stroke burden borne by the piezoelectric actuator 30 is less than when the image pick-up element alone is moved, thus obtaining the same advantage as that of the preceding embodiment. Here, the in-focus state can be obtained even if any lens group other than the zoom lens group is moved in the video camera's lens system. That is, even in an arrangement other than those of the first and second embodiments, if the actuator for image pick-up element drive is mechanically coupled by a motion transmission means to a portion of an associated lens group other than the zoom lens group, then it is possible to obtain the same advantage as set out in conjunction with the preceding embodiment. It is to be noted, however, that, since the mechanism of the lens system becomes complex if the focus lens group 11 is of a movable type, an associated lens group other then the focus lens group is desirably caused to be moved.

Figure 6:
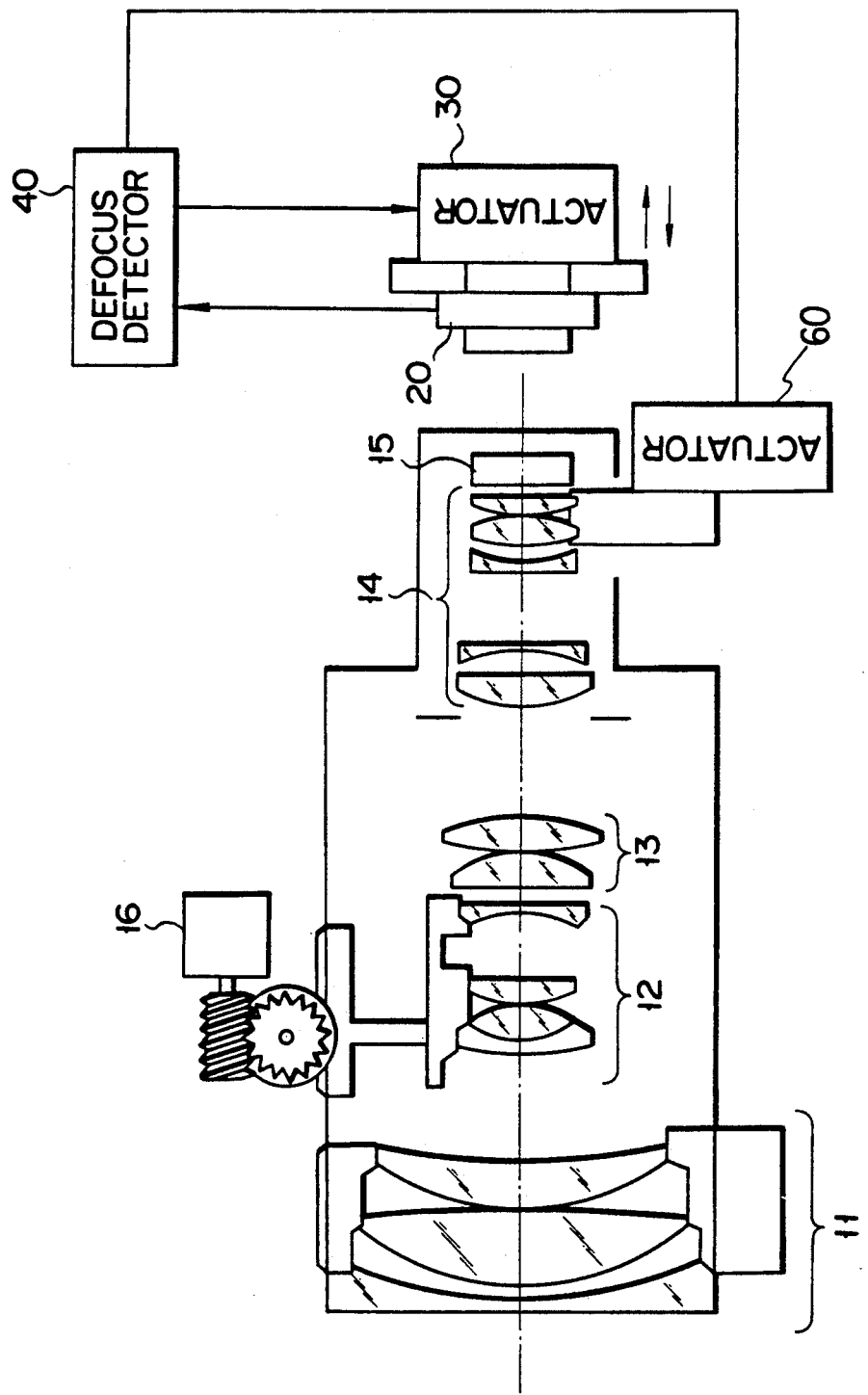
FIG. 6 is a diagrammatic view showing an apparatus according to a third embodiment of the present invention.

FIG. 6 is a diagrammatic view showing a third embodiment of the present invention with the same reference numerals employed to designate parts or elements corresponding to those shown in FIG. 1.

The third embodiment is different from the first embodiment in providing a drive means for a relay lens group 14. That is, the relay lens group 14 it connected directly to a piezoelectric actuator 60 so that it may be driven by that actuator 60. The actuator 60 is responsive to a defocus signal from a defocus detection circuit 40 to operate with a phase opposite to that of a piezoelectric actuator 30 for image pick-up element drive. In this arrangement it is only necessary to move the actuators in a less amount than in the case of moving either one of the actuator 30 or 60 so that a just-in-focus state is achieved. It is thus possible to alleviate a stroke burden borne by the piezoelectric actuator.

Figure 7A:
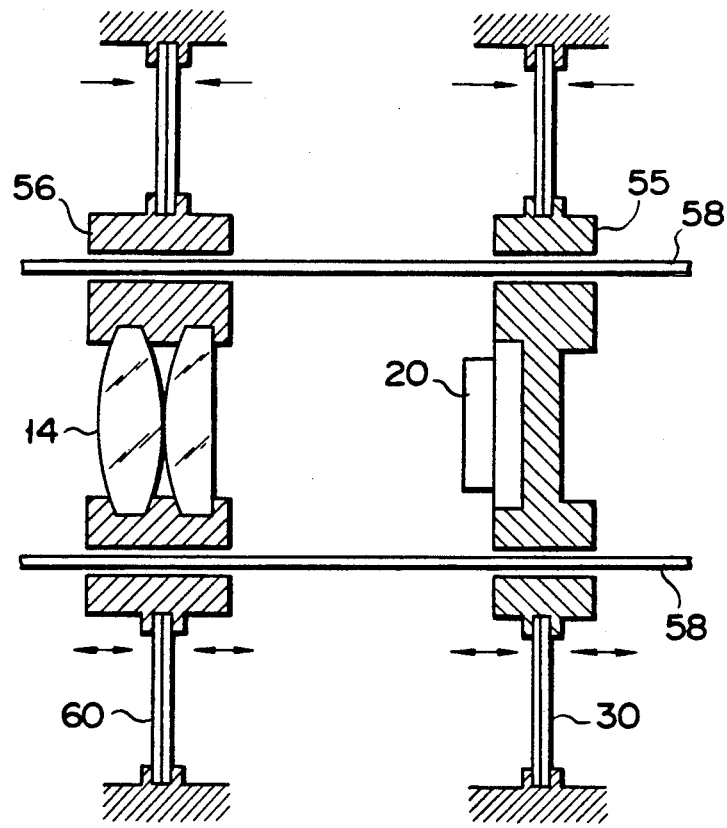
FIGS. 7A and 7B are views for showing a practical form of a piezoelectric actuator and that of a guide in the apparatus of the third embodiment.

In the third embodiment, use is made, as the piezoelectric actuators 30 and 60, of ring-like bimorph elements as shown in FIG. 7A. The piezoelectric actuator 30 composed of a ring-like bimorph element is fixed at its outer peripheral edge to an associated fixing member and at its inner circumferential edge to a retainer 55. Similarly, the piezoelectric actuator 60 composed of a ring-like bimorph element is fixed at its outer peripheral edge to the associated fixing member and at its inner circumferential edge to a retainer 56.

Figure 7B:
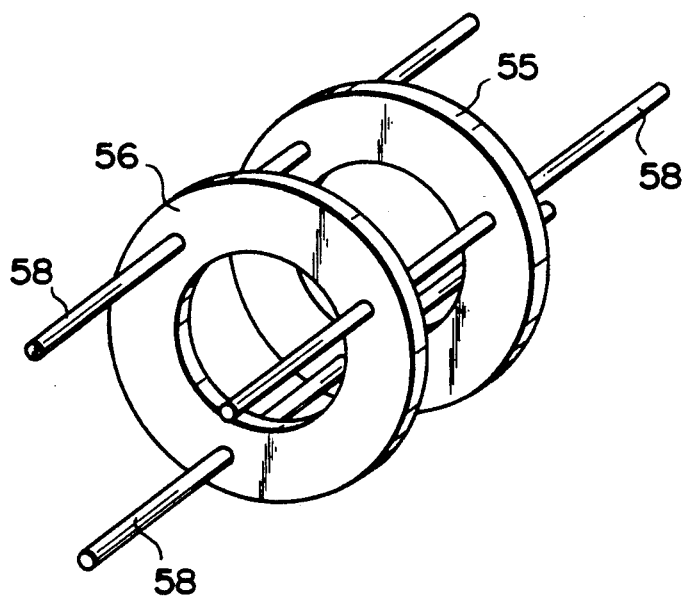

The ring-like bimorph element is subjected to a polarizing treatment in a radial direction with divided electrons provided thereon. If a voltage is applied to the bimorph element with the outer peripheral edge of the element fixed, then it is possible to take out an axial (a ring axis) displacement component at the inner circumstance of the bimorph element. Further, the retainers 55, 56 are supported by three guides 58, as shown in FIG. 7B, such that they can be moved in their axial direction. This arrangement allows the pick-up element 20 and relay lens group 14 to be moved in parallel motion at all times and, even if the element 20 and relay lens group 14 are moved independently, can ensure an adequate extent of their parallelism.

The present invention is not restricted to the aforementioned embodiment. For example, the piezoelectric actuator is not restricted to the structure as shown in FIGS. 2 and 3 and a proper actuator may be utilized if a one-way displacement component can be taken out through the utilization of the piezoelectric element. The arrangement of the motion transmission mechanism is not restricted to that shown in FIG. 4 and a proper mechanism may be used if it can transmit a motion in a direction opposite to that in which the motion of the image pick-up element is carried out. Further, the lens system, though being shown as the four lens groups, may properly be modified in accordance with a design specification. A lens system including a variator lens group and fixed lens group may be added to the four-group lens array shown in FIG. 1. Although, in the aforementioned embodiment, the piezoelectric actuator has been explained as being driven based on an image picked up at the image pick-up element, it may be driven in accordance with the distance data measured relative to the subject with the use of an ultrasonic wave or an infrared ray so that a just-in-focus state may be obtained.

Various changes or modifications of the present invention can be made without departing from the spirit and scope of the present invention.

Additional advantages and modifications will readily occur to those skilled in the art. Therefore, the invention in its broader aspects is not limited to the specific details, and representative devices, shown and described herein. Accordingly, various modifications may be without departing from the spirit or scope of the general inventive concept as defined by the appended claims and their equivalents.

What is claimed is:

1. An automatic focus control apparatus for a video camera including a lens system comprised of a plurality of lens groups, wherein at least one of the lens groups is a relay type, comprising:

an image pick-up element for picking up an optical image which is obtained through the lens system and for outputting an image signal corresponding to the optical image;

defocus detection means for detecting a defocus of the lens system from the image signal which is obtained at the image pick-up element and for outputting a defocus signal in accordance with the detected defocus;

drive means comprised of a piezoelectric actuator for moving the image pick-up element in a direction of an optical axis of the lens system in accordance with the defocus signal obtained at the defocus detection means, wherein said piezoelectric actuator is comprised of a plurality of element groups each having a plurality of superimposed piezoelectric bimorph elements which are driven in a figure S fashion, said element groups being fixed with each other at one end of said plurality of elements such that ends opposite said one end are displaced, whereby the amount each of the elements is driven is added; and a motion transmission mechanism for connecting the image pick-up element to the relay type lens group in the lens system and for moving the connected lens group in a direction opposite too that in which the image pick-up element is moved.

2. An automatic focus control apparatus for a video camera including a lens system comprised of a plurality of lens groups, which comprises:

an image pick-up element for picking up an optical image which is obtained through the lens system and for outputting an image signal corresponding to the optical image;

defocus detecting means for detecting a defocus of the lens system from the image signal which is obtained at the image pick-up element and for outputting a defocus signal in accordance with the detected defocus;

drive means comprised of a piezoelectric actuator for moving the image pick-up element in a direction of an optical axis of the lens system in accordance with the defocus signal obtained at the defocus detection means, wherein said piezoelectric actuator is comprised of a ring-like piezoelectric bimorph element having an outer peripheral edge and an inner circumferential edge, the ring-like piezoelectric bimorph element being of such a type that its outer peripheral edge is connected to a fixing end and its inner circumferential edge is used as a free circumferential edge which is a displacement component take-out edge; and a motion transmission mechanism for connecting the image pick-up element to at least one of the lens groups in the lens system and for moving the connected lens group in a direction opposite to that in which the image pick-up element is moved.

3. The apparatus according to claim 2, wherein said lens system is comprised of a focus lens group, a zoom lens group, a focal position correction lens group and a relay lens group, the focal position correction lens being moved together with said image pick-up element.

4. The apparatus according to claim 2, wherein said lens system is comprised of a focus lens group, a zoom lens group, a focal position correction lens group and a relay lens group, the relay lens group being moved together with said image pick-up element.

5. An automatic focus control apparatus for a video camera including a lens system comprised of a plurality of lens groups, comprising:

an image pick-up element for picking up an optical image through the lens system and for outputting an image signal corresponding to the optical image;

defocus detection means for detecting a defocus of the lens system from the image signal obtained at the image pickup element and for outputting a defocus signal corresponding to that defocus;

first drive means comprised of a piezoelectric actuator for moving the image pick-up element in a direction of an optical axis of the lens system in accordance with the defocus signal obtained from the defocus detection means;

second drive means comprised of a piezoelectric actuator for moving at least one of the lens groups of the lens system, in accordance with the defocus signal, in a direction opposite to that in which the image pick-up element is moved; and wherein respective said piezoelectric actuators are comprised of a plurality of superimposed piezoelectric bimorph elements which are driven in a figure S fashion and are fixed with each other at one end of said plurality of elements such that ends opposite said one end are displaced, whereby the amount each of the elements is driven is added.

6. An automatic focus control apparatus for a video camera including a lens system comprised of a plurality of lens groups, comprising:

an image pick-up element for picking up an optical image through the lens system and for outputting an image signal corresponding to the optical image;

defocus detection means for detecting a defocus of the lens system from the image signal obtained at the image pickup element and for outputting a defocus signal corresponding to that defocus;

first drive means comprised of a piezoelectric actuator for moving the image pick-up element in a direction of an optical axis of the lens system in accordance with the defocus signal obtained from the defocus detection means;

second drive means comprised of a piezoelectric actuator for moving at least one of the lens groups of the lens system, in accordance with the defocus signal, in a direction opposite to that in which the image pick-up element is moved; and wherein respective said piezoelectric actuators are comprised of a ring-like piezoelectric bimorph element having an outer peripheral edge and an inner circumferential edge, the ring-like piezoelectric element being of such a type that its outer peripheral edge is connected to a fixing terminal and its inner circumferential edge is used as a free edge which is a displacement component take-out terminal.

7. The apparatus according to claim 5, wherein said lens system is comprised of a focus lens group, a zoom lens group, a focal position correction lens group and a relay lens group, the focal position correction lens group being moved by said second drive means.

8. The apparatus according to claim 5, wherein said lens system is comprised of a focus lens group, a zoom lens group, a focal position correction lens group and a relay lens group, the relay lens group being moved by said second drive means.

* * * * *